Sept. 27, 1932.    C. W. HEATH    1,880,135
AUTOMATIC LOCKING GAS TANK COVER
Filed March 10, 1930    2 Sheets-Sheet 2
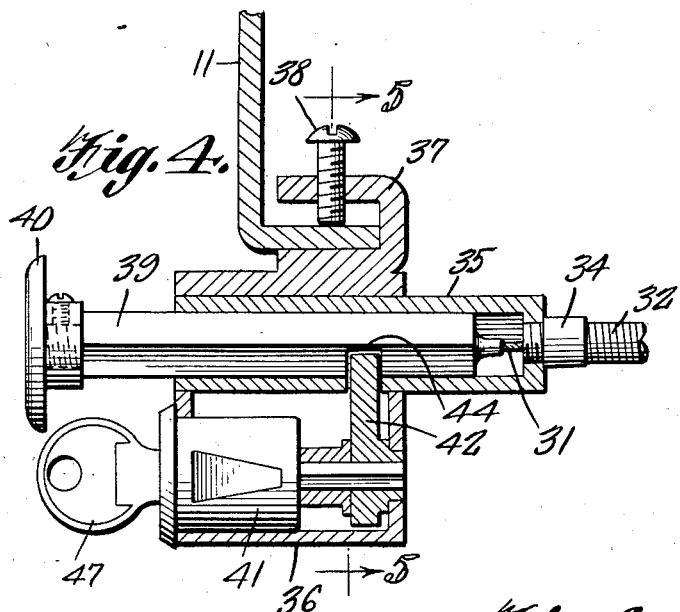
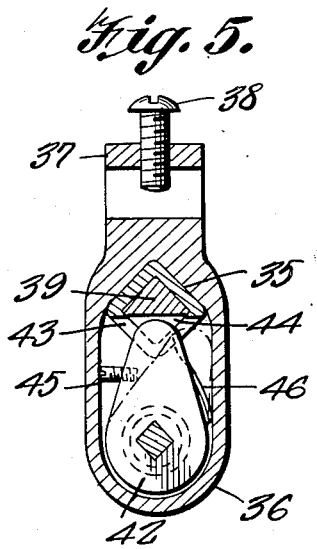
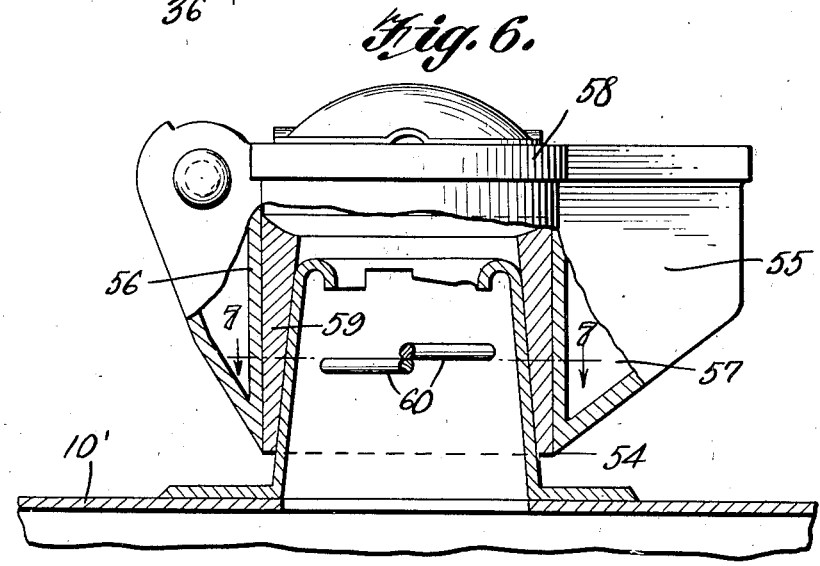
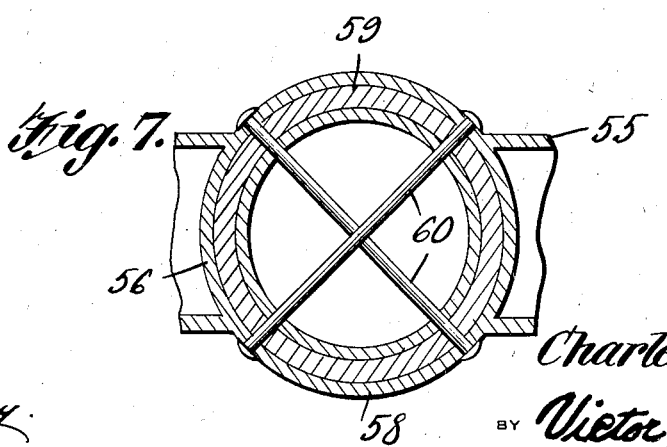
Charles W. Heath,
INVENTOR
BY Victor J. Evans
ATTORNEY Patented Sept. 27, 1932

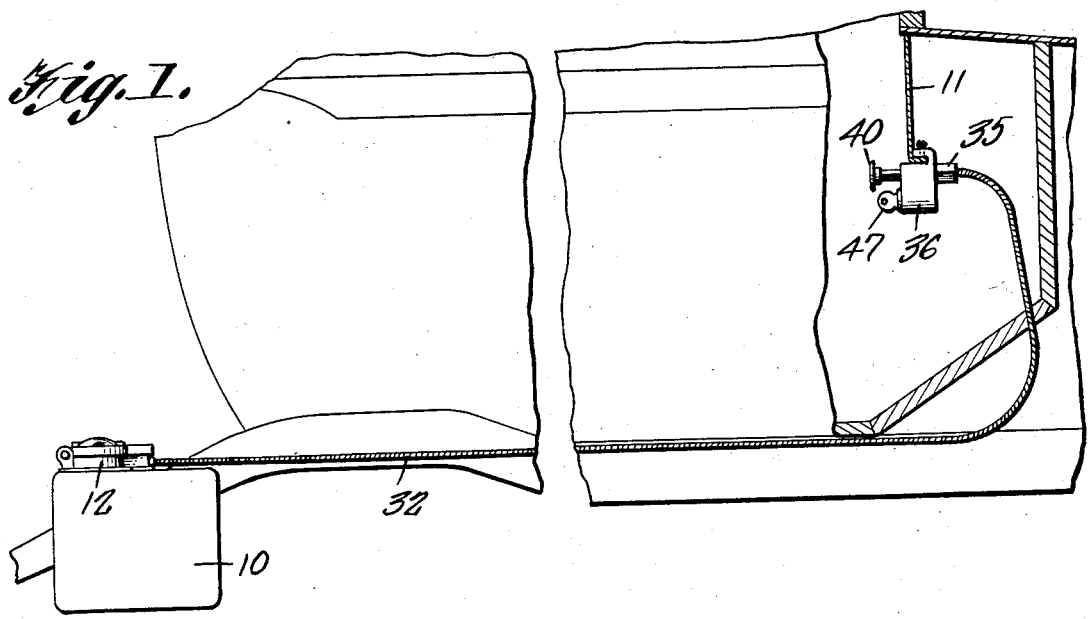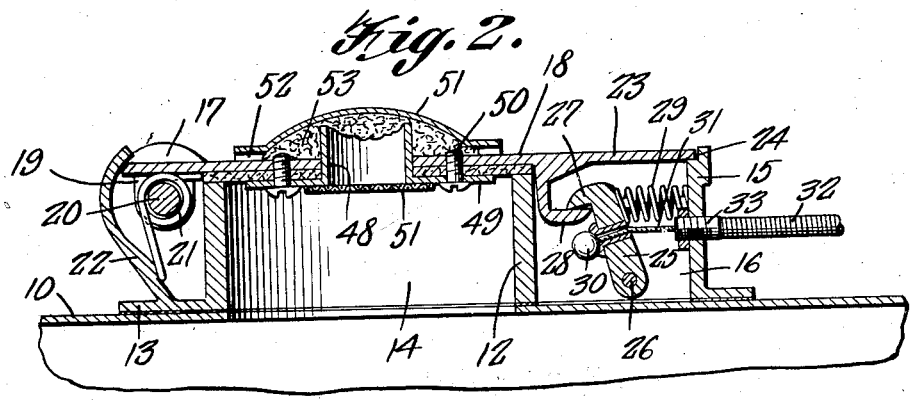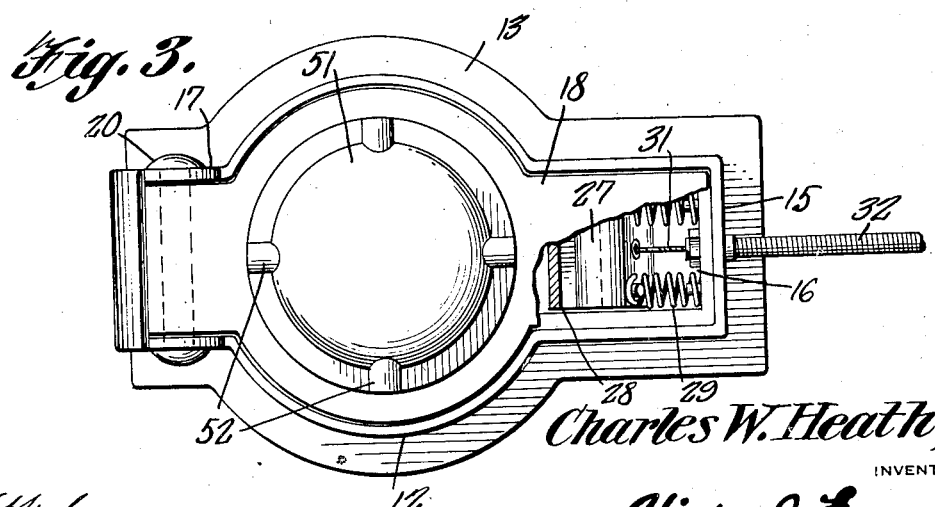

1,880,135

UNITED STATES PATENT OFFICE

CHARLES W. HEATH, OF SIOUX CITY, IOWA

AUTOMATIC LOCKING GAS TANK COVER

Application filed March 10, 1930. Serial No. 434,775.

This invention relates to closure caps especially designed for the filling openings of automobile fuel tanks, an object being to provide means for automatically locking the cap in closed position, together with means arranged within convenient reach of the driver to release the cap.

Another object of the invention is the provision of a fuel tank cap lock having releasing means positioned within the automobile, so that when the automobile is locked, the cap will also be locked and theft of the contents of the tank will be prevented.

With the above and other objects in view, the invention further includes the following novel features and details of construction, to be hereinafter more fully described, illustrated in the accompanying drawings and pointed out in the appended claims.

In the drawings:—

Figure 1 is a fragmentary view of a portion of an automobile with parts broken away and shown in section to illustrate the invention.

Figure 2 is an enlarged vertical sectional view showing the invention applied to the tank of an automobile, a fragmentary portion of the tank being shown.

Figure 3 is a top plan view with parts broken away.

Figure 4 is an enlarged sectional view illustrating the means for locking the cap releasing mechanism.

Figure 5 is a section on the line 5—5 of Figure 4.

Figure 6 is a fragmentary view partly in section showing the invention as an automobile attachment.

Figure 7 is a section on the line 7—7 of Figure 6.

Referring to the drawings in detail wherein like characters of reference denote corresponding parts, the reference character 10 indicates the fuel tank of an automobile and 11 the instrument board, while the filling neck of the tank 10 is indicated at 12.

The neck 12 forms a part of a housing which is provided with a flange 13, the latter being permanently and suitably secured to the tank 10 around the filling opening 14. The housing is provided with an extension 15, so that a chamber or compartment 16 is located between the neck 12 and the extension.

Hingedly secured to the neck 12 between spaced ears 17 is a closure cap 18. This cap is provided with spaced apertured ears 19 for the passage of a hinge pin 20. The pin 20 is surrounded by a coil spring 21 and one end of this spring is arranged within a pocket defined by the ear 17 and a connecting wall 22, while the opposite end of the spring bears against the adjacent end of the cap 18. The cap is thus yieldingly held in opened position.

The cap is provided with an extension 23 whose edges are seated within a flange 24 which extends around the upper edge of the extension 15, so that the cap 18 forms a closure for the filling opening of the tank and the chamber or compartment 16. Located within this chamber or compartment 16 is a cap holding device in the form of a pivotally mounted latch 25. The pivot of this latch is indicated at 26 and the opposite end of the latch carries an offset bill 27 which is adapted to engage a keeper 28 carried by the extension 25 of the closure cap and positioned within the compartment 16. The bill 27 and the keeper 28 are beveled so that when the cap moves to a closed position these beveled ends will engage and permit the keeper to move downward beneath the bill of the latch. The latch is normally urged in keeper engaging position by means of a spring 29.

Secured to the latch as indicated at 30 is one end of a cable, chain or wire 31. This cable, chain or wire passes through a flexible pipe 32, one end of which is secured to the outer wall of the extension 15 as shown at 33. The opposite end of this pipe is secured within a nipple 34 carried at the outer end of a guide sleeve 35.

The guide sleeve 35 extends from a lock housing 36 which is attached to the instrument board 11. For this purpose, the lock housing is provided with an arm 37 which carries a clamping screw 38 and this screw is engaged with the flange of the instrument board 11 so as to clamp the lock housing in position as clearly shown in Figure 4 of the drawings.

Slidable within the sleeve 35 is a stem 39 which is rectangular in cross section and the interior of the sleeve is similarly shaped. The stem 39 may thus have a sliding fit within the sleeve but will be held against rotation. A finger piece or button 40 is secured to the outer end of the stem, so that by pulling upon this finger piece or button the latch 25 may be disengaged from the keeper 28, whereupon the cap may be swung pivotally upward to uncover the filling opening 14.

The lock housing 36 carries a lock 41 which includes an arm 42. This arm is capable of lateral swinging movement when the lock is operated so that the free end of this arm will pass into or out of a slot 43 provided in the sleeve 35 and be engaged and disengaged from a notch 44 provided in the stem 39.

By reference to Figures 4 and 5 of the drawings it will be seen that when the arm is engaged within the notch 44 the stem will be held against operation and release of the cap holding means or latch 25 will be prevented. Movement of the arm in one direction is resisted by a stop 45, while a spring 46 yieldingly resists movement in an opposite direction. A key 47 may be provided for the operation of the lock 41.

From the foregoing description and accompanying drawings it will be seen that when the cap is closed the latch 25 will automatically engage the keeper 28 and operation of this latch may be prevented through the lock 41. When it is desired to open the cap, the lock 41 is manipulated to release the stem 39 so that this stem may be pulled outward to disengage the latch from the keeper. When the latch is disengaged, the cap will move to an opening position under the influence of the spring 21.

The cap 18 is provided with an opening through which passes a thimble 48. This thimble is flanged at its inner end and is permanently secured to an annular plate 49, this plate being in turn secured to the cap by means of screws 50. A screen 51 is positioned over the inner end of the thimble 48 and the latter is surmounted by a dome-shaped member 51. This member is provided with air passages 52 so as to prevent the formation of a vacuum within the tank. In addition, the cap may be filled with a suitable filtering material 53 so as to prevent dirt, dust and other extraneous matter from entering the tank through the air passages.

In the form of the invention just described, the invention is designed to be built upon the tank and installed as a part of the regular equipment. In Figure 6 however the invention is shown as an accessory which may be applied at any time. In this form of the invention, the permanent filling neck of the tank 10' is indicated at 54, while the invention includes a housing 55. This housing comprises a neck receiving portion 56 and a latch compartment 57 within which is arranged a latching mechanism of the character previously described. A cap 58 similar to the cap 18 is provided for closing the filling opening.

In order to provide a leak-proof connection between the housing and the neck 54, the invention provides a tapered or wedge-shaped soft metal bushing 59 which is interposed between the neck and the neck receiving portion 56. This latter portion of the housing may thus be wedged into position upon the neck 54 and secured thereto by means of radially extending pins 60 which extend through the neck, the bushing and the neck receiving portion of the housing.

The invention is susceptible of various changes in its form, proportions and minor details of construction and the right is herein reserved to make such changes as properly fall within the scope of the appended claims.

Having described the invention what is claimed is:—

1. The combination with a fuel tank having a filling opening, of a housing on the tank about said opening with a walled compartment projected therefrom, a closure cap for the housing and pivoted to the housing, an extension on the cap to overhang the compartment for closing the same, a keeper formed at the underside of the extension to lie within the compartment when said cap is closed, a latch pivoted within the compartment and engageable with the keeper, springs located within the compartment and active upon the latch to normally hold it engaged with the keeper, a pull element projected into the compartment and connected with the latch for retracting the latter against the action of the spring, and a flange about the housing and wall of the compartment to provide a seat for the cap and extension.

2. The combination with a fuel tank having a filling opening, of a housing on the tank about said opening with a walled compartment projected therefrom, a closure cap for the housing and pivoted to the housing, an extension on the cap to overhang the compartment for closing the same, a keeper formed at the underside of the extension to lie within the compartment when said cap is closed, a latch pivoted within the compartment and engageable with the keeper, springs located within the compartment and active upon the latch to normally hold it engaged with the keeper, a pull element projected into the compartment and connected with the latch for retracting the latter against the action of the spring, a flange about the housing and wall of the compartment to provide a seat for the cap and extension, and an overhang on the cap for its pivotal connection with the housing to conceal said connection.

In testimony whereof I affix my signature.

CHARLES W. HEATH.